United States Patent
Nuzman

(10) Patent No.: US 10,455,079 B2
(45) Date of Patent: Oct. 22, 2019

(54) EFFECTIVE CROSSTALK ESTIMATION IN PRESENCE OF CLIPPING ERRORS

(71) Applicant: Nokia Solutions and Networks OY, Espoo (FI)

(72) Inventor: Carl J. Nuzman, Union, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 148 days.

(21) Appl. No.: 15/697,731

(22) Filed: Sep. 7, 2017

(65) Prior Publication Data
US 2019/0075202 A1    Mar. 7, 2019

(51) Int. Cl.
| | |
|---|---|
| H04M 3/00 | (2006.01) |
| H04M 3/18 | (2006.01) |
| H04B 3/32 | (2006.01) |
| H04B 7/0417 | (2017.01) |
| H04B 7/06 | (2006.01) |

(52) U.S. Cl.
CPC .......... *H04M 3/007* (2013.01); *H04B 3/32* (2013.01); *H04M 3/18* (2013.01); *H04B 7/0421* (2013.01); *H04B 7/0634* (2013.01)

(58) Field of Classification Search
CPC ...... H04M 3/007; H04M 3/18; H04B 7/0421; H04B 7/0634
See application file for complete search history.

(56) References Cited

U.S. PATENT DOCUMENTS

| | | | |
|---|---|---|---|
| 2012/0207197 A1* | 8/2012 | Lv | H04M 11/062 375/224 |
| 2015/0163350 A1* | 6/2015 | Shi | H04M 11/062 379/1.03 |
| 2016/0286037 A1 | 9/2016 | Emad et al. | |

OTHER PUBLICATIONS

"Self-FEXT cancellation (vectoring) for use with VDSL2 transceivers," Series G: Transmission Systems and Media, Digital Systems and Networks, ITU-T G.993.5, Apr. 2010.

* cited by examiner

*Primary Examiner* — Melvin C Marcelo
(74) *Attorney, Agent, or Firm* — Harness, Dickey & Pierce, P.L.C.

(57) ABSTRACT

A method of reducing crosstalk into a victim line from disturber lines in a communication system may include obtaining a pilot matrix and a measurement vector associated with the pilot matrix, the pilot matrix representing pilot signals transmitted by at least the disturber lines, the measurement vector being influenced by the pilot signals via the crosstalk; estimating estimated crosstalk coefficients of significant ones of the disturber lines by solving a reduced linear system using only non-clipped measurements in the measurement vector, the reduced linear system being derived from the pilot matrix; determining compensation coefficients to reduce the crosstalk based on the estimated crosstalk coefficients; and reducing crosstalk by one or more of pre-compensating signals transmitted on the victim line and post-compensating signals received on the victim line based on the compensation coefficients.

20 Claims, 5 Drawing Sheets

EFFECTIVE CROSSTALK ESTIMATION IN PRESENCE OF CLIPPING ERRORS

BACKGROUND

1. Field

Example embodiments relate generally to an apparatus configured to estimate crosstalk coefficients in a communication system and/or reduce crosstalk into a victim line from disturber lines in the communication system based on the estimated crosstalk coefficients, a method and/or a non-transitory computer readable medium configured to perform same.

2. Related Art

Performance of a digital subscriber line (DSL) in terms of capacity may depend on a number of factors such as attenuation and a noise environment. Performance of a DSL transmission system may be impacted by crosstalk interference from one twisted line pair to another twisted line pair with the same binder and, to a lesser extent, twisted line pairs in neighboring binders.

Consequently, crosstalk interference may affect data rates across a number of twisted pair lines.

For instance two communication lines such as two VDSL2 lines which are collocated next to each other induce a signal in each other. Due to the induced crosstalk and noise from other sources in the surroundings of the communication line, the data transported on these lines may be affected or corrupted by the crosstalk and noise. By reducing the crosstalk induced on a communication line or compensating the crosstalk induced on a communication line, the amount of corrupted data may be reduced and the rate at which information can be reliably communicated is increased.

Each communication line is a possible disturber line which induces crosstalk in one or more victim lines. Moreover, in today's systems, the number of active communication lines may vary. Thus, the induced crosstalk varies as the number of active communication lines vary.

When a communication line joins, an initialization process establishes a communication session over a given line. Typically, the initialization process occurs when a number of other lines are already carrying active communication sessions.

In order for the new communication session to start with a maximum rate possible, the access node may determine the coefficients of crosstalk channels from active lines into the new joining line. The access node may determine these crosstalk coefficients by sending pilot signals on all lines, and observing the resulting received signal at the receiver of the new line.

G.vector uses mutually orthogonal pilots and correlation as described in "Self-FEXT cancellation (vectoring) for use with VDSL2 transceivers," *Series G: Transmission Systems and Media, Digital Systems and Networks, ITU G.993.5*, April 2010, the entire contents of which is incorporated by reference.

SUMMARY

One or more example embodiments relate to a method of reducing crosstalk into a victim line from disturber lines in a communication system.

In some example embodiments, the method includes obtaining a pilot matrix and a measurement vector associated with the pilot matrix, the pilot matrix representing pilot signals transmitted by at least the disturber lines, the measurement vector being influenced by the pilot signals via the crosstalk; estimating estimated crosstalk coefficients of significant ones of the disturber lines by solving a reduced linear system using only non-clipped measurements in the measurement vector, the reduced linear system being derived from the pilot matrix; determining compensation coefficients to reduce the crosstalk based on the estimated crosstalk coefficients; and reducing crosstalk by one or more of pre-compensating signals transmitted on the victim line and post-compensating signals received on the victim line based on the compensation coefficients.

In some example embodiments, the method includes determining which elements of the measurement vector are clipped measurements and which of the elements are the non-clipped measurements; and determining which of the disturber lines are insignificant disturber lines and significant disturber lines, wherein the estimating includes setting the estimated crosstalk coefficients associated with the insignificant disturber lines to zero.

In some example embodiments, the estimating includes determining reduced pilot matrices; and estimating the estimated crosstalk coefficients by solving a least squares problem based on the reduced pilot matrices.

In some example embodiments, the method includes the solving the least squares problem includes computing pseudo-inverse matrices; and multiplying the non-clipped measurements by the pseudo-inverse matrices to generate the estimated crosstalk coefficients.

In some example embodiments, the estimating includes applying the pilot matrix to initial sparse ones of the estimated crosstalk coefficients to generate predicted measurement values; overwriting clipped measurement values with the predicted measurement values to generate corrected measurement values; multiplying the corrected measurement values by a transpose of the pilot matrix to generate dense ones of the estimated crosstalk coefficients; and overwriting ones of the dense ones of the estimated crosstalk coefficients associated with the insignificant disturber lines to zero to obtain improved sparse ones of the estimated crosstalk coefficients.

In some example embodiments, the method includes determining the initial sparse ones of the estimated crosstalk coefficients for one of a plurality of tones based on extrapolating or interpolating the improved sparse ones of the estimated crosstalk coefficients associated with other tones of the plurality of tones.

In some example embodiments, the other tones of the plurality of tones are tones having a lower frequency than the one of the plurality of tones.

In some example embodiments, the estimating includes iteratively improving the estimated crosstalk coefficients until a stop condition is satisfied.

In some example embodiments, the estimating determines that the stop condition is satisfied when the estimated crosstalk coefficients for a current iteration is sufficiently close to the estimated crosstalk coefficients for a previous iteration.

In some example embodiments, the obtaining obtains the pilot matrix such that columns of the pilot matrix represent columns of a Fourier matrix or Walsh-Hadamard Matrix.

One or more example embodiments relate to a device.

In some example embodiments, the device includes one or more processors configured to reduce crosstalk into a victim line from disturber lines in a communication system by, obtaining a pilot matrix and a measurement vector associated with the pilot matrix, the pilot matrix representing pilot signals transmitted by at least the disturber lines, the measurement vector being influenced by the pilot signals via the crosstalk, estimating estimated crosstalk coefficients of significant ones of the disturber lines by solving a reduced linear system using only non-clipped measurements in the measurement vector, the reduced linear system being derived from the pilot matrix, determining compensation coefficients to reduce the crosstalk based on the estimated crosstalk coefficients, and reducing crosstalk by one or more of pre-compensating signals transmitted on the victim line and post-compensating signals received on the victim line based on the compensation coefficients.

In some example embodiments, the one or more processors are further configured to, determine which elements of the measurement vector are clipped measurements and which of the elements are the non-clipped measurements; and determine which of the disturber lines are insignificant disturber lines and significant disturber lines, wherein the one or more processors are configured to estimate the estimated crosstalk coefficients of significant ones of the disturber lines by setting the estimated crosstalk coefficients associated with the insignificant disturber lines to zero.

In some example embodiments, the one or more processors are configured to estimate the estimated crosstalk values of significant ones of the disturber lines by, determining reduced pilot matrices; and estimating the estimated crosstalk coefficients by solving a least squares problem based on the reduced pilot matrices.

In some example embodiments, the one or more processors are configured to estimate the estimated crosstalk values of significant ones of the disturber lines by, applying the pilot matrix to initial sparse ones of the estimated crosstalk coefficients to generate predicted measurement values; overwriting clipped measurement values with the predicted measurement values to generate corrected measurement values; multiplying the corrected measurement values by a transpose of the pilot matrix to generate dense ones of the estimated crosstalk coefficients; and overwriting ones of the dense ones of the estimated crosstalk coefficients associated with the insignificant disturber lines to zero to obtain improved sparse ones of the estimated crosstalk coefficients.

In some example embodiments, the one or more processors are further configured to determine the initial sparse ones of the estimated crosstalk coefficients for one of a plurality of tones based on extrapolating or interpolating the improved sparse ones of the estimated crosstalk coefficients associated with other tones of the plurality of tones.

In some example embodiments, the other tones of the plurality of tones are tones having a lower frequency than the one of the plurality of tones.

In some example embodiments, the one or more processors are configured to estimate the estimated crosstalk values of significant ones of the disturber lines by iteratively improving the estimated crosstalk coefficients until a stop condition is satisfied.

In some example embodiments, the one or more processors are configured to determine that the stop condition is satisfied when the estimated crosstalk coefficients for a current iteration is sufficiently close to the estimated crosstalk coefficients for a previous iteration.

In some example embodiments, the one or more processors are configured to obtain the pilot matrix such that columns of the pilot matrix represent columns of a Fourier matrix or Walsh-Hadamard Matrix.

One or more example embodiments relate to a non-transitory computer readable medium storing instructions.

In some example embodiments, the instructions, when executed by one or more processors, configure the one or more processors to, reduce crosstalk into a victim line from disturber lines in a communication system by, obtaining a pilot matrix and a measurement vector associated with the pilot matrix, the pilot matrix representing pilot signals transmitted by at least the disturber lines, the measurement vector being influenced by the pilot signals via the crosstalk, estimating estimated crosstalk coefficients of significant ones of the disturber lines by solving a reduced linear system using only non-clipped measurements in the measurement vector, the reduced linear system being derived from the pilot matrix, determining compensation coefficients to reduce the crosstalk based on the estimated crosstalk coefficients, and reducing crosstalk by one or more of pre-compensating signals transmitted on the victim line and post-compensating signals received on the victim line based on the compensation coefficients.

One or more example embodiments relate to a method of estimating crosstalk into a victim line from disturber lines in a communication system.

In some example embodiments, the method includes obtaining a pilot matrix and a measurement vector associated with the pilot matrix, the pilot matrix representing pilot signals transmitted by at least the disturber lines, the measurement vector being influenced by the pilot signals via the crosstalk; and estimating estimated crosstalk coefficients of significant ones of the disturber lines by solving a reduced linear system using only non-clipped measurements in the measurement vector, the reduced linear system being derived from the pilot matrix.

In some example embodiments, the method further includes displaying the estimated crosstalk coefficients to a user via a display device or an image forming apparatus.

BRIEF DESCRIPTION OF THE DRAWINGS

At least some example embodiments will become more fully understood from the detailed description provided below and the accompanying drawings, wherein like elements are represented by like reference numerals, which are given by way of illustration only and thus are not limiting of example embodiments and wherein.

DETAILED DESCRIPTION

Figure 1:
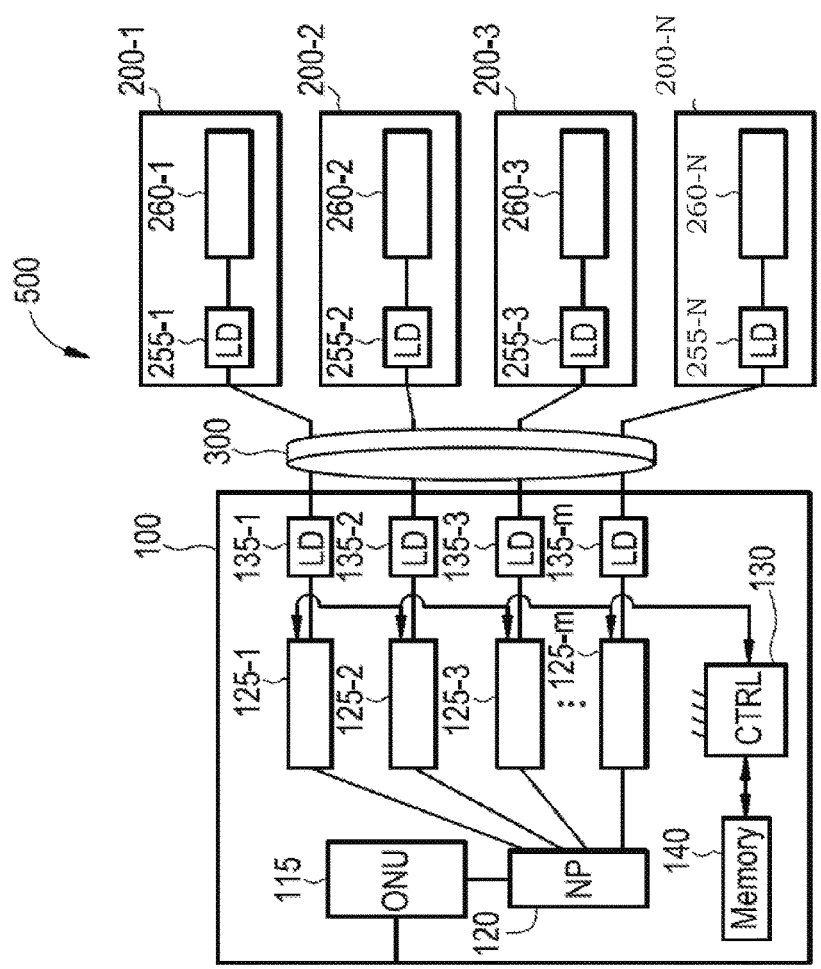
FIG. 1 illustrates a communication network according to some example embodiments.

Various example embodiments will now be described more fully with reference to the accompanying drawings in which some example embodiments are shown.

Detailed illustrative example embodiments are disclosed herein. However, specific structural and functional details disclosed herein are merely representative for purposes of describing at least some example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "or" includes any and all combinations of one or more of the associated listed items.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments are described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing endpoints, clients, gateways, nodes, agents, controllers, computers, cloud based servers, web servers, proxies or proxy servers, application servers, and the like. As discussed later, such existing hardware may include, inter alia, one or more Central Processing Units (CPUs), system-on-chip (SOC) devices, digital signal processors (DSPs), application-specific-integrated-circuits, field programmable gate arrays (FPGAs) computers or the like.

Although a flow chart or communication flow diagram may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

The terms "including" and/or "having", as used herein, are defined as comprising (i.e., open language). The term "coupled", as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, clients, gateways, nodes, agents controllers, computers, cloud based servers, web servers, application servers, proxies or proxy servers, and the like, may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

The endpoints, clients, gateways, nodes, agents, controllers, computers, cloud based servers, web servers, application servers, proxies or proxy servers, and the like, may also include various interfaces including one or more transmitters/receivers connected to one or more antennas, a computer readable medium, and (optionally) a display device. The one or more interfaces may be configured to transmit/receive (wireline and/or wirelessly) data or control signals via respective data and control planes or interfaces to/from one or more network elements, such as switches, gateways, termination nodes, controllers, servers, clients, and the like.

Benefits, other advantages, and solutions to problems will be described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

The example embodiments may have different forms and/or be combined, and should not be construed as being limited to the descriptions set forth herein.

FIG. 1 illustrates a communication system according to some example embodiment.

As shown in FIG. 1, a system 500 may include a distribution point or access node (AN) 100 and Customer Premises Equipment (CPEs) 200-1 to 200-N, where N may be an integer greater than 1, the access node 100 and the CPEs 200-1 to 200-N may be connected via respective communication lines 300.

The access node 100 may be under control of an operator. The access node 100 may include an optical network unit (ONU) 115, a network processor (NP) 120, processing devices 125-1 to 125-m, a controller 130, and analog front ends (AFEs) 135-1 to 135-m, which may each include a line driver (LD).

The ONU 115 may be configured to communicate with the network processor (NP) 120. The ONU 115 may provide a high-bandwidth data connection over a fiber optic channel to an optical line terminal (OLT) located in a central office. The ONU 115 may pass received downstream data frames or packets to the NP 120, and the NP 120 may determine the destination for the frames or packets and accordingly forward the frames or packets to an appropriate interface (e.g., DSL, ADSL, VDSL, VDSL2, G.fast, etc. interface). Similarly, in the upstream direction, the NP 120 forwards frames or packets from the interfaces to the ONU 115.

The NP 120 may provide signals to the processing devices 125-1 to 125-m. The processing devices 125 may be configured for point-to-point communication.

Each of the processing devices 125 may communicate with a respective one of the CPEs 200 over the communication lines 300 through an associated one of the AFEs 135-1 to 135-m. The lines 300 (also referred to as links) may be telephone lines (e.g., twisted copper pairs), and the CPEs 200-1 to 200-N may be modems or other interface devices operating according to a communication standard for transmitting data over telephone lines. The CPEs 200-1 to 200-N may be located in various customer premises.

Each of the CPEs 200-1 to 200-N may include an AFE 255-1 to 255-m and respective processing devices 260-1 to 260-m. Each of the AFEs 255-1 to 255-m may be the same or substantially the same as the AFEs 135-1 to 135-m.

The controller 130 may be configured to receive signal data collectively referred to as a signal vector from the processing devices 125. The signal data may include signal values intended to be received by corresponding ones of the processing devices 260-1 to 260-m in the CPEs 200.

In the downstream direction, the controller 130 may also be configured to precode the signal vector, and send the resulting data back to the processing devices 125 for transmission to the CPEs 200. The processing devices 125 then send the precoded signal data over the respective communication lines 300 via the respective AFEs 135-1 to 135-m.

In the upstream direction, the processing devices 125 receive crosstalk-contaminated signals from the AFEs 135. The controller 130 receives the crosstalk-contaminated signals (collectively referred to as received signal vector) from the processing devices 125, postcodes the received signal vector, and provides the processing devices 125 with the post-compensated signal data. The processing devices 125 then continue to process the signal data to demodulate the intended upstream information.

In vectored DSL systems, downstream crosstalk channel coefficients are estimated by the access node 100 sending pilot sequences downstream, measuring the received error at the CPE 200, and forwarding the received error samples back to the access node 100 for further processing. The format of the error samples may be standardized (G.vector), and may include clipping of the measurements when outside of a specified range. In lines with strong crosstalk, and especially when using the higher frequencies made available in the new VDSL2 35b profile, significant clipping can occur, leading to poor vectoring performance and significant loss of data rate. There may also be an analogous problem in upstream estimation, although this problem can be less constrained by standardization since the error samples may be both measured and processed by the access node 100.

Generally, the data exchanged between processing devices would be frequency-domain samples, but alternatively the data could be represented as time-domain samples, for example.

As discussed above, the controller 130 communicates with the processing devices 125. Alternatively, the controller 130 may be between the processing devices 125 and the respective AFEs 135-1 to 135-M. Thus, the location of the controller 130 is not limited to the location shown in FIG. 1.

Furthermore, it will be understood that the access node 100 may include a memory, or multiple memories. The NP 120, the controller 130, and/or the processing devices 125 may execute programs and/or program modules stored on the memory to perform their respective functions and the functions of the access node 100. The operation of the access node 100 will be described in greater detail below with respect to some example embodiments. The memories may be external to and/or internal to the NP 120, the controller 130, and/or the AFEs 135. For the purposes of simplicity of illustration only, only a memory 140 associated with the controller 130 is shown.

The system 500 may utilize discrete multi-tone modulation (DMT). A DMT system uses a number of orthogonal subcarriers simultaneously.

Example embodiments take advantage of the geometry of a system. More specifically, because of the geometry of the system, the crosstalk experienced by a joining line typically comes from only a portion of the active lines already in the system.

When collecting larger and larger groups of twisted pair lines for vectoring, using twisted pair cable types commonly in use, the number of lines providing significant crosstalk into a particular line does not grow without bound. Crosstalk may be considered significant if the crosstalk causes a significant reduction in information carrying capacity of the system, e.g., if the data rates, when a disturber line is active, are less than the data rates when the disturber line is inactive, by more than a threshold percent. As an example, crosstalk may be insignificant if it is lower in strength than other sources of noise in the system, such as thermal noise in receiver circuitry.

The lines providing crosstalk greater than a threshold (e.g., significant crosstalk) may be referred to as significant disturber lines. The number of significant disturber lines is limited by geometric considerations, since typically the crosstalk strength is related to the physical proximity in a binder, and only so many lines can be in close proximity to each other.

As a result, in a large system, the crosstalk coupling vector g is expected to be sparse, having a limited number of significant components whose positions in the crosstalk coupling vector g are not known a priori.

According to example embodiments, low frequency tones or historic information are used to identify the non-zero coefficients.

During an initialization process for the joining line, there may be N−1 active lines, each of which is a potential disturber, such that after initialization, there are N active lines. As will be used throughout the description, the cross coupling vector g is a vector of length N and represents the channel coupling coefficients from each of the N lines into the N-th line, respectively. To facilitate the description of example embodiments, the cross coupling vector g may be considered as an N×1 column vector.

The raw error feedback e[k] received on a victim line on tone k can be modeled as:

$$e[k]=PT[k]g[k]a \qquad \text{Eq. 1}$$

In Eq. 1, P is the L×N pilot matrix, where L is the number of time periods and N is the number of active lines. T[k] is a diagonal N×N matrix with relative transmit gains on the diagonal, g[k] is an N-vector of relative crosstalk coefficients, and a is the complex 4-QAM constellation point having a real/imaginary value (1+j) on a 2D complex plane.

The raw error feedback e[k] may be processed using a clipping function φ prior to sending the error feedback to the access node 100. The processed error sample $e^c[k]$ may then be expressed via Equation 2:

$$e^c[k]=\phi(e[k])=\phi(PT[k]g[k]a) \qquad \text{Eq. 2}$$

In equation 2, φ is the clipping function (hard limiter in real and imaginary parts).

A conventional access node may estimate crosstalk by simply considering $e[k]=e^c[k]$, and by rearranging Equation 2 to obtain an estimated channel vector ĝ[k] of the channel vector g[k] using Equation 3:

$$\hat{g}[k]=T[k]^{-1}(La)^{-1}P^Te^c[k] \qquad \text{Eq. 3}$$

In the absence of clipping, this conventional crosstalk estimation may accurately recover the crosstalk (ignoring noise), because the pilots are orthogonal and satisfy $P^TP=LI$.

However, when the error samples are clipped, the clipping error is definable using Equation 4:

$$\delta[k]=e^c[k]-e[k]=\phi(PT[k]g[k]a)-PT[k]g[k]a \qquad \text{Eq. 4}$$

The resulting deterministic error in the crosstalk vector may then be expressed using Equation 5:

$$\hat{g}[k]-g[k]=T[k]^{-1}(La)^{-1}P^T\delta[k] \qquad \text{Eq. 5}$$

As discussed below with reference to FIG. 2, in one or more example embodiments, rather than simply use the processed estimates of crosstalk $e^c[k]$ to estimate the crosstalk coupling vector g[k], the controller 130 may, for each tone k, estimate the crosstalk coupling vector g[k] using only elements of the processed error vector $e^c[k]$ that are not clipped (i.e., that are equal to corresponding elements of e[k]). To reduce the number of unknown values of the crosstalk coupling vector g[k] to be estimated, the controller 130 may only estimate elements of the crosstalk coupling vector g[k] corresponding to significant disturbers, replacing other elements of the crosstalk coupling vector g[k] with zero.

Figure 2:
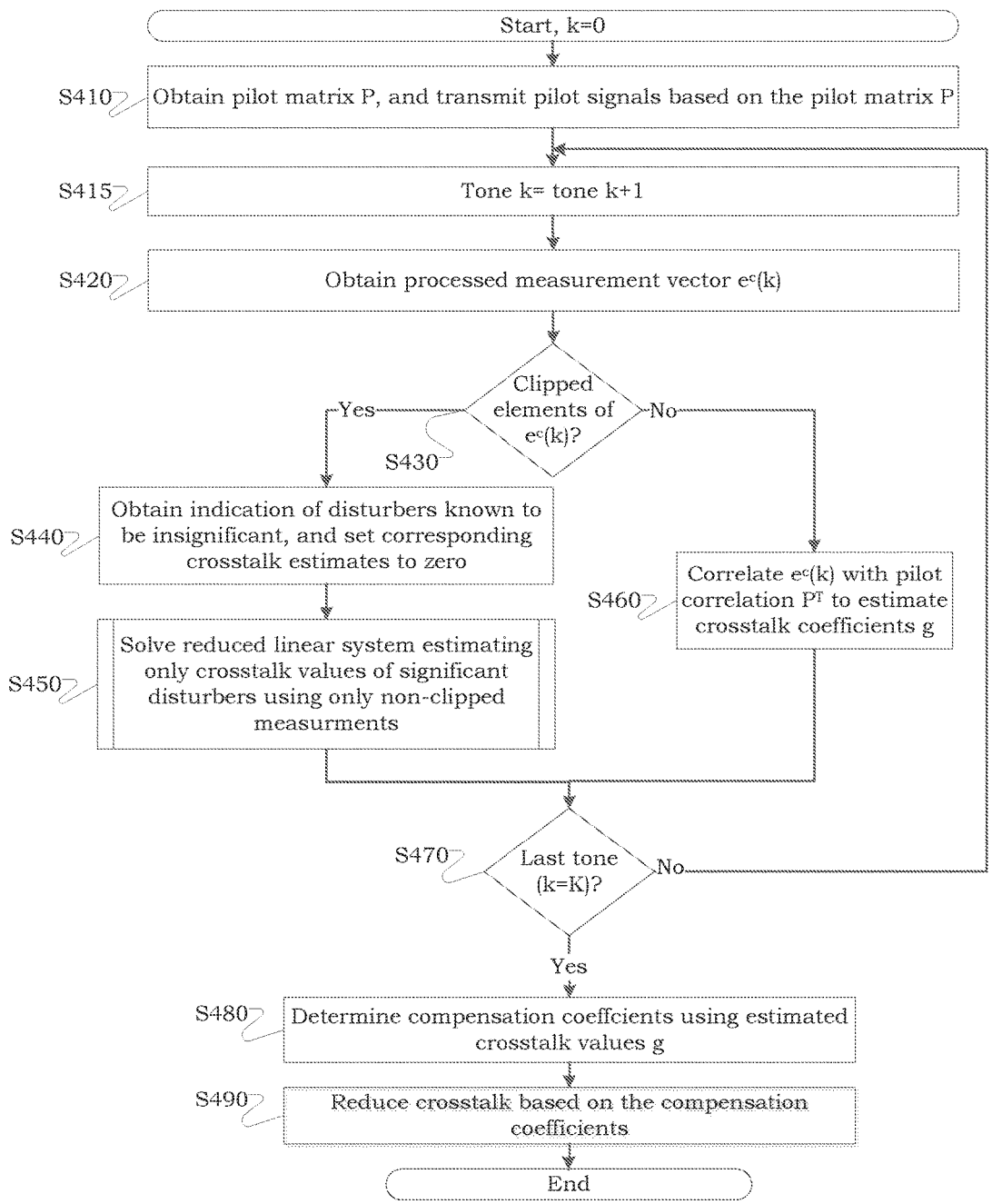
FIG. 2 illustrates a method of initializing a joining line in a communication system having a plurality of current active lines according to some example embodiments.

FIG. 2 illustrates a method of initializing a joining line in a communication system having a plurality of current active lines according to some example embodiments.

Referring to FIGS. 1 and 2, for the purposes of description only, this embodiment will be described with respect to implementation on the system of FIG. 1. For example, three lines associated with CPE 200-1 to 200-3 in FIG. 1 may be considered current active lines and a fourth line associated with CPE 200-N may be a joining line.

While the example embodiments will be described with respect to a joining line and a plurality of current active lines, example embodiments are not limited thereto. For example, a group of lines simultaneously join a vectored system such as the system 500 shown in FIG. 1, in which case the crosstalk from one or more of the joining lines on another one of the joining lines may also be estimated. Furthermore, crosstalk between current active lines may be estimated using error samples provided by the CPE associated with one or more active lines. Moreover, the crosstalk from the current active lines on another line may be estimated, where the other line had previously joined the system shown in FIG. 1, but has been in a power-saving operation mode for a period of time and is now returning to normal-power operation mode. Accordingly, terms such as "joining line" and "at least a first line" may refer to line(s) for which a crosstalk coupling vector is to be determined and terms such as "a plurality of active lines" and "a plurality of second lines" may refer to lines from which the crosstalk experienced by a joining line/at least a first line comes from.

The method may start by the controller 130 of the access node 100 initializing an index of the tones k to an initial tone. In some example embodiments 130 the controller 130 may process tones k in the processed measurement vector $e^c[k]$ from low tones to high tones and, therefore, the initial tone may be, for example, tone zero.

Thereafter, in operation S410, the controller 130 may obtain a pilot matrix P having L×N dimensions with N columns of length L where the pilot matrix represents pilot signals transmitted by at least the disturber lines, and transmit the pilot signals across the active lines based on the obtained pilot matrix P.

For example, the controller 130 may generate the pilot matrix P by choosing any L×N orthogonal matrix $\overline{P}$, that is, any real matrix such that the product $\overline{P}^T\overline{P}$ is equal to a diagonal matrix S with positive diagonal entries. The pilot matrix P can then be obtained as a scaled version of $\overline{P}$, via the formula $P=\overline{P}S^{-1/2}\sqrt{L}$, which ensures that $P^TP=LI$.

In a system operating according to the G.vector standard, it is expected that each element of the matrix should be equal to +1 or −1. Such a pilot matrix P can be obtained by taking a subset of N columns of an L×L Walsh-Hadamard matrix; methods for generating such matrices are well-known to those skilled in the art.

The controller 130 may assign a different pilot sequence/column to each of the N lines, where the sequence tells the line what pilot value to send in each of the L time slots.

The controller 130 may provide the pilot matrix P to the processing devices 125. The processing devices 125 then transmit pilot signals over the plurality of subcarriers in accordance with sequence of pilots identified in the pilot matrix P.

In some example embodiment, the system 500 is a discrete multi-tone modulation (DMT) system, which uses a number of orthogonal subcarriers simultaneously. Accordingly, the processing devices 125 may independently and in parallel transmit pilot signals on each subcarrier, in accordance with the pilot matrix P. Therefore, the controller 130 may provide the pilot matrix P to the processing devices 125 and the processing devices 125 transmit pilot signals, over the plurality of subcarriers, across the plurality of current active lines as well as the joining line in accordance with sequence of pilots identified in the pilot matrix P. In a typical DMT setting the processing device 125 for line n may receive the pilot value P[t,n] to be sent on line n at time t. The processing device may compute corresponding complex tone data $u_n[t,k]=P[t,n] s_n[k] a$, for each tone k=1, . . . K, where $s_n[k]$ is a transmit scaling and a is the complex point (1+j). The tone data $u_n[t,k]$ for a fixed value of t would be processed via IDFT and other known steps to obtain a time-domain DMT symbol for transmission.

In some example embodiments, the controller 130 may structure the pilot matrix P in a way to facilitate low complexity matrix multiplication when multiplying elements by the pilot matrix P. For example, this multiplication can use the Fast Fourier Transform, if the columns of P are selected from a Fourier matrix. Further, the multiplication can use the Fast Hadamard Transform, if the controller 130 selects the columns of P from a Walsh-Hadamard matrix. For example, a L×N pilot matrix P may be obtained from an L×L Walsh-Hadamard matrix W, by concatenating N out of the L columns of W. The indices of the subset of columns chosen can be denoted J. To apply the matrix P to a vector x of length N, a vector x' of length L is created. The elements of the vector x are inserted into the elements of x' indexed by the set J, and the remaining elements of x' are set to zero. Applying the Fast Hadamard Transform to the vector x' may have the same effect as multiplying the vector x' by W, which has the same effect as multiplying the vector a by P.

In operation S415, the controller 130 may advance the index of the tones k to a next tone k+1.

In operation S420, the controller 130 may obtain the processed measurement vector $e^c(k)$ for the joining line for the currently selected tone k in a set of subcarriers K. The processed measurement vector $e^c(k)$ is a L×1 column vector that represents the error samples computed at a receiver of the CPE 200-n of the joining line during the L time instances such that the measurement vector $e^c(k)$ is influenced by the pilot signals via the crosstalk, and which are obtained by normalizing the values received at the receiver and subtracting the known or estimated pilot value.

The processed measurement vector is modeled by Equation 6:

$$e^c(k)=M[k]g(k)+z(k) \qquad \text{Eq. 6}$$

where z(k) is a L×1 column vector representing measurement noise associated with the kth subcarrier, g[k] is a N×1 vector of normalized crosstalk coefficients to be estimated, where M[k] is the L×N matrix M[k]=PT[k] a, and where T[k] is an N×N diagonal matrix with $T_{nn}[k]=s_n[k]/s_N[k]$.

In a system operating according to G. vector, the processed measurement vector $e^c[k]$ may be obtained as error feedback from the joining line N while sending pilot signals specified by the scaled pilot matrix M[k].

In operation S430, the controller 130 may determine whether any of the elements in the processed measurement vector $e^c[k]$ were clipped, and may proceed to operation S440 if clipped elements are present on tone k, or proceed to operation S460 if none of the elements of the measurement vector have experienced clipping on tone k.

For example, the controller 130 may assume that a real or imaginary element of received error feedback $e^c[k]$ that is equal to a clipping threshold has been clipped. The clipping threshold in use by a particular CPE device 200 may be known to the controller 130 because it is specified in a standard recommendation, or specified by the manufacturer, or it may be inferred by the controller 130 based on the largest error feedback value historically observed from that CPE device 200. The controller 130 may assume that a received error feedback component $e^c_n[k]$ for a tone k that is equal to a clipping threshold is a measurement that has been clipped. Thus, it is assumed that the access node 100 either knows or can estimate the clipping threshold used on each CPE 200. In some example embodiments, the controller 130 may determine that the received error feedback $e^c_n[k]$ for a tone k is clipped if the real or imaginary part of the received error feedback $e^c_n[k]$ is perfectly equal to 1 or −1. However, example embodiments are not limited thereto.

In operation S440, if clipped elements are present on tone k, the controller 130 may determine which of the disturbers N are "insignificant," and which are "significant." For example, based on the crosstalk estimates observed on previously processed tones without clipped error samples, the disturbers are divided into two groups:

Significant disturbers: with statistically significant non-zero crosstalk.

Insignificant disturbers: disturbers with estimated crosstalk consistent with the values expected from noise alone. To estimate the level of noise in the system, the controller can use correlation with a matrix Q orthogonal to the pilot matrix P, as described below in conjunction with operation S460.

The controller may set corresponding crosstalk estimates g[k] to zero for the insignificant disturbers.

In operation S450, the controller 130 may solve a reduced linear system to estimate crosstalk values g[k] of only significant disturbers, using only non-clipped elements of the processed measurement vector $e^c[k]$ as input.

As discussed below with reference to FIGS. 3 and 4, the controller 130 may solve the reduced linear system using various methods including a brute-force method described with reference to FIG. 3 and an iterative method described with reference to FIG. 4.

In contrast, in operation S460, when the controller 130 determines that none of the elements in the processed measurement vector $e^c[k]$ are clipped, the controller 130 may estimate the crosstalk vector $g[k]$ with the normal procedure using Eq. 3, discussed supra by correlating the processed measurement vector $e^c[k]$ with the pilot matrix P, as represented by multiplication with the transposed pilot matrix $P^T$.

In addition, the controller 130 may estimate the noise variance on tone k by correlating the processed measurement vector $e^c[k]$ with a matrix Q that is orthogonal to the pilot matrix P, that is, if Q is a full rank L×M matrix, M≤L–N, such that $Q^T P=0$. Then for a tone k without clipping, the controller 130 may obtain the M×1 vector $\theta[k]=Q^T e^c[k]$ by correlating the processed measurement vector with Q. Due to the orthogonality, the result is equal to $\theta[k]=Q^T z[k]$. Assuming that the elements of the noise vector $z[k]$ are independent, zero-mean samples with variance $\sigma^2[k]$, the controller 130 may estimate the noise variance affecting the error samples on tone k as $$\hat{\sigma}^2[k] = \frac{\sum_{i=1}^{M}|\theta_i[k]|^2}{\sum_{i=1}^{M}\sum_{n=1}^{L}|Q_{ni}|^2}.$$

Knowing this variance, the controller 130 may estimate the expected contribution of noise to the result of Eq. 3, providing a means of distinguishing between significant disturbers (for example having crosstalk estimates above the level of typical noise-induced estimation errors), and insignificant disturbers (having crosstalk estimates at or below the level of typical noise-induced estimation errors).

In operation S470, the controller 130 may determine whether the index indicates that the tone k is the last of the tones K. For example, in a G.vector system the set of tones for which the CPEs provide error samples is configured by the VCE, and K would be the number of tones in this set.

If the controller 130 determines that there are additional tones k to process, the controller 130 may proceed back to operation S415, advance the index of the tones to k+1, and obtain the processed measurement vector $e^c[k+1]$ for tone k+1. Alternatively, if the controller 130 determines that the tone k is the last tone, the controller may proceed to operation S480.

In operation S480, the controller 130 may use the estimated crosstalk values to determine compensation coefficients to protect the joining line associated with CPE 200-n from crosstalk from the active lines associated with CPEs 200-1 to 200-3.

For example, the controller 130 may use pre-compensation for downstream communication, and set the pre-compensation coefficients as follows:

$P_{Nj}=-g_j$, for each $j=1,\ldots,N-1$    Eq. 7 where j is an index applied for every line from 1 to N and $C_{Nj}$ is the pre-compensation coefficient for protecting line N from crosstalk from line j. The controller 130 may use post-compensation for upstream communication, and set post-compensation coefficients as follows:

$C_{Nj}=-v_j$, for each $j=1,\ldots,N-1$ where j is an index applied for every line from 1 to N and $C_{Nj}$ is the post-compensation coefficient for protecting line N from crosstalk from line j, where $v=g^T G_{N-1}^{-1}$ is a 1×N vector obtained by multiplying the estimated crosstalk coefficients g with the inverse of the (N–1)×(N–1) crosstalk matrix $G_{N-1}$, where $G_{N-1}$ represents the crosstalk coefficients between all previously active lines, as previously estimated in conjunction with the activation of those lines.

In operation S490, to subsequent time periods, with respect to communication from the access node to the CPEs, the controller 130 may use the pre-compensation coefficients to pre-compensate the data signals transmitted on the joining line N in order to reduce (or, alternatively, to eliminate) crosstalk into the line associated with CPE 200-N. In particular, tone data values are sent from all processing devices 125-1 to 125-N to the controller 130, the controller 130 adds pre-compensation signals to the signals based on the pre-compensation coefficients, and the controller sends the pre-compensated signal to the corresponding processing device 125-N. In the cable 300, the crosstalk signals from disturber lines 1 through N–1 into victim line N are removed by interacting with the pre-compensation signal transmitted on victim line N.

Further, with respect to communication from the CPEs to the access node, the controller 130 may similarly define post-compensation coefficients to post-compensate data signals received from the jointing line N to reduce (or, alternatively, to eliminate) crosstalk into the line associated with CPE 200-N. For example, received upstream tone data values may be sent from all processing devices 125-1 to 125-N to the controller 130. The controller 130 may determine post-compensated data signals by forming linear combinations of the received tone data values according to the post-compensation coefficients, and the controller may send the post-compensated signal to the corresponding processing device 125-N. The post-compensation has the effect of reducing (or, alternatively, eliminating) the effects of crosstalk signals from disturber lines 1 through N–1 into victim line N that are present in the received tone data.

While example embodiments above describe an embodiment in which, after the controller 130 estimates crosstalk values $g[k]$ of only significant disturbers using only non-clipped elements of the processed measurement vector $e^c[k]$ as input, the controller 130 uses, in operations S480 and S490, the estimated crosstalk values to determine compensation coefficients and reduces crosstalk based on the determined compensation coefficients, example embodiments are not limited thereto. For example, in other example embodiments, after estimating crosstalk values $g[k]$ of only significant disturbers using only non-clipped elements of the processed measurement vector $e^c[k]$ as input, the controller 130 may provide the estimated crosstalk values to a technician or device for further processing without performing operations S480 and S490. For example, the estimated crosstalk values may be displayed on a display device or printed via an image forming apparatus in a form that enables a technician to evaluate the quality of one or more communication lines in the cable 300. Further, in other example embodiments, the controller 130 may use the estimated crosstalk values $g[k]$ to adjust transmit power levels on one or more communication lines in the cable 300 to affect beneficial tradeoffs among data communication rates across the communication lines.

Figure 3:
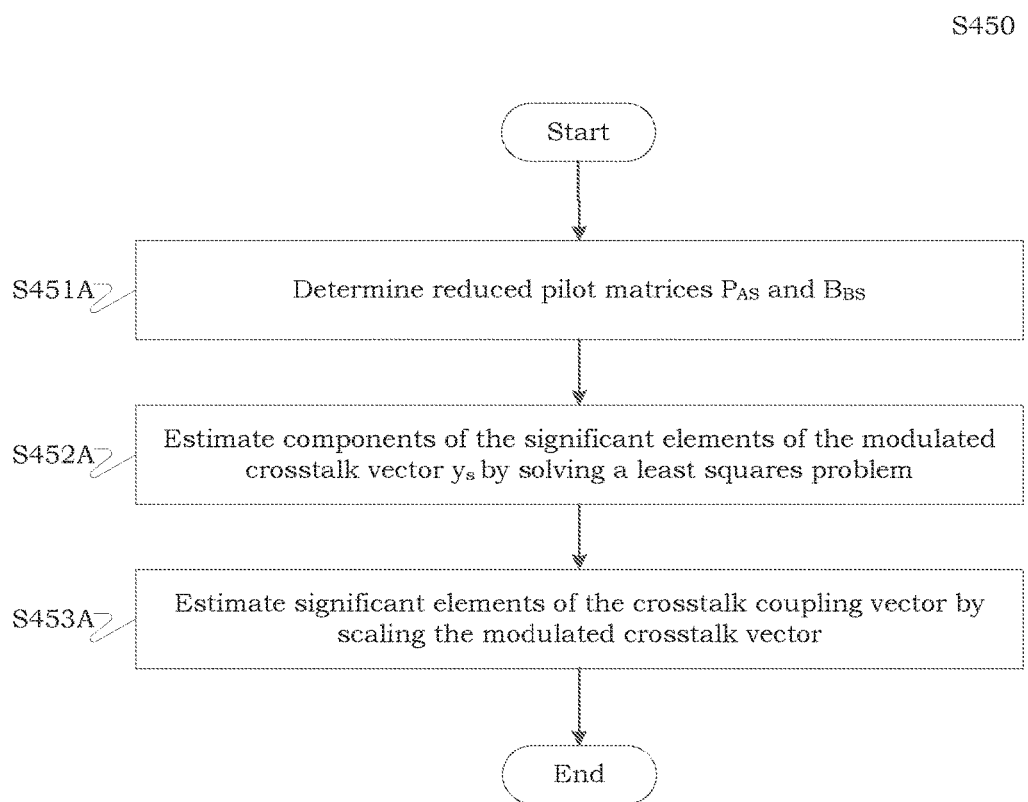
FIG. 3 illustrates a brute-force method of solving a reduced linear system to estimate cross talk values of only significant disturbers according to some example embodiments.

FIG. 3 illustrates a brute-force method of solving a reduced linear system to estimate cross talk values of only significant disturbers according to some example embodiments.

Referring to FIGS. 1 to 3, in operation S451A, the controller 130 may determine a reduced linear system by determining reduced pilot matrices $P_{AS}$ and $P_{BS}$.

For example, the controller 130 determines a subset A of elements of the processed measurement vector $e^c[k]$ such that the real component is not clipped, and a subset B of elements of the processed measurement vector $e^c[k]$ such that the imaginary component is not clipped. From operation S440, the controller 130 may already have obtained a subset S of lines whose crosstalk coefficients may be significant. The reduced pilot matrix $P_{AS}$ is obtained from the pilot matrix P by removing all rows of P not in the set A, and all columns of P not in the set S, and the reduced pilot matrix $P_{BS}$ is similarly obtained from the sets B and S.

These reduced matrices define a reduced linear system $e_A^R = P_{AS} y_S^R + z_A^R$ for the real measurement component and a reduced linear system $e_B^I = P_{BS} y_S^I + z_B^I$ for the imaginary measurement component. In this system, $y_S^R$ and $y_S^I$ are the real and imaginary components, respectively, of the modulated crosstalk vector $y_S = a T_{SS} g_S$, where $g_S$ represents the significant subset of the crosstalk vector g, and where $T_{SS}$ represents the submatrix of T[k] including only rows and columns from the significant subset S.

Thereafter, in operation S452A, the controller 130 may solve a linear least squares problem to obtain estimates of the modulated crosstalk vector components $y_S^R$ and $y_S^I$ from the measurements $e_A^R = P_{AS} y_S^R + z_A^R$ and $e_B^I = P_{BS} y_S^I + z_B^I$. For example, if $P_{AS}$ and $P_{BS}$ are of full rank, the controller may multiply the measurements by pseudo-inverse matrices using the following Equation:

$$\hat{y}_S^R = (P_{AS}^T P_{AS})^{-1} P_{AS}^T e_A^R$$

$$\hat{y}_S^I = (P_{BS}^T P_{BS})^{-1} P_{BS}^T e_B^I \qquad \text{Eq. 8}$$

Other numerical methods of solving the linear least squares problems such as by QR decomposition or Cholesky decomposition known to those skilled in the art may alternatively be used.

In operation S453A, the controller 130 may estimate the significant elements of the crosstalk coupling vector by scaling the modulated crosstalk vector estimates as follows:
$\hat{g}_S = a^{-1} T_{SS}^{-1} (\hat{y}_S^R + j \hat{y}_S^I)$.

Figure 4:
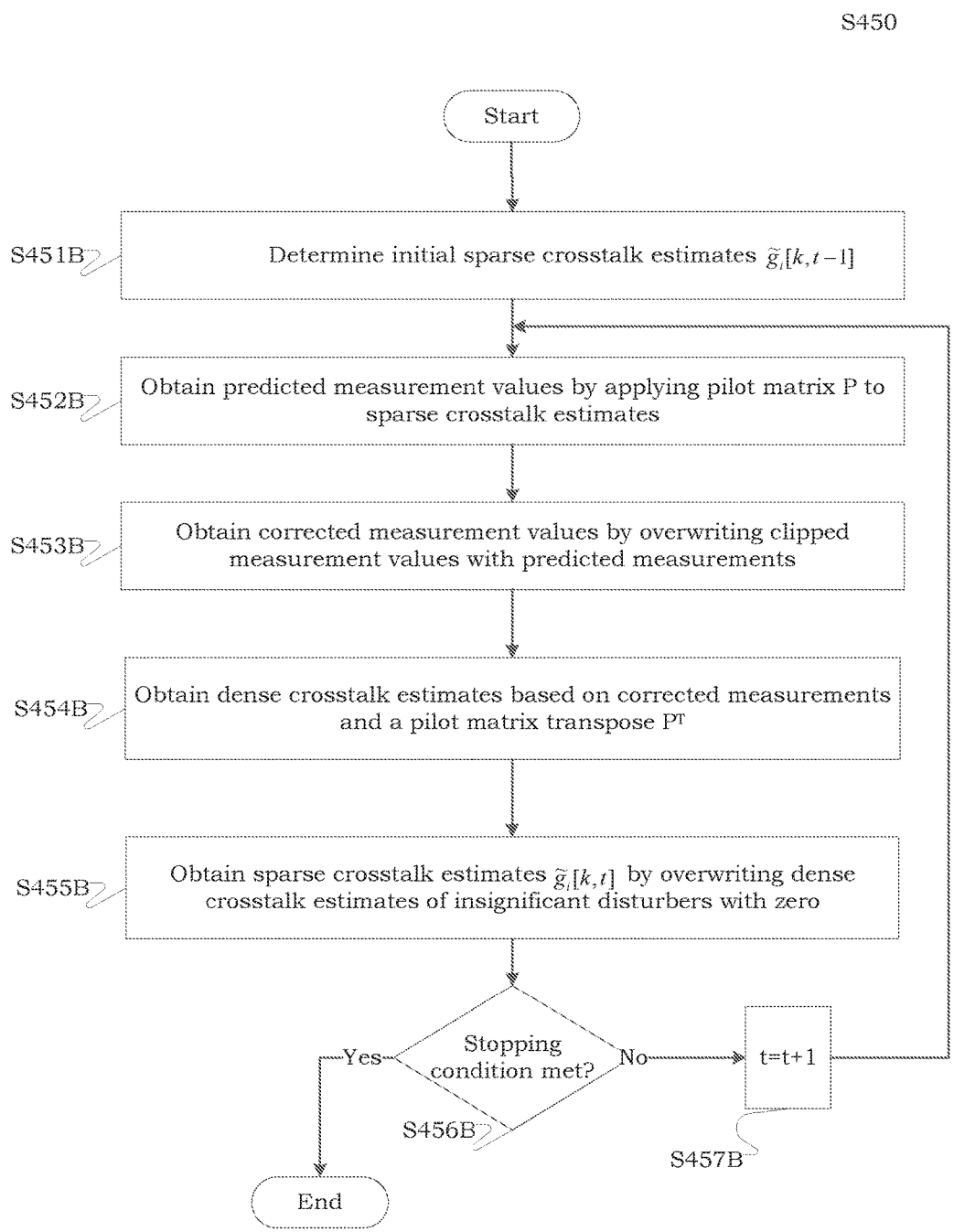
FIG. 4 illustrates an iterative method of solving a reduced linear system to estimate cross talk values of only significant disturbers according to some example embodiments.

FIG. 4 illustrates an iterative method of solving a reduced linear system to estimate cross talk values of only significant disturbers according to some example embodiments.

Referring to FIGS. 1, 2 and 4, in operation S451B, the controller 130 may determine initial sparse crosstalk estimates $\tilde{g}[k,0]$ and may define an initial iteration variable to t=1.

In some example embodiments, the controller 130 may extrapolate the initial crosstalk estimates for tone k from the final crosstalk estimates on other tones. For example, the controller 130 may predict the expected crosstalk coefficient vector by linear extrapolation from the previous two tones, namely tone k−1 and tone k−2:

$$\tilde{g}_i[k,0] = 2\tilde{g}_i[k-1] - \hat{g}_i[k-2] \text{ if } i \text{ is a significant disturber} \qquad \text{Eq. 9}$$

The indices, k, k−1, and k−2 refer to tones for which error samples are available. Therefore, if error samples are collected only on every 4th tone, each index k may be separated by four tones, such that tones 1004 and 1000 are utilized when estimating crosstalk on tone 1008.

While linear interpolation may introduce some error into the crosstalk estimate $\tilde{g}[k,0]$, the controller 130 may reduce this error in each iteration.

In operation S452B, the controller 130 may apply the pilot matrix P to the sparse crosstalk estimates $\tilde{g}[k]$ and perform scaling to obtain the predicted error feedback:

$$\tilde{e}[k] = PT[k]\tilde{g}[k]a \qquad \text{Eq. 10}$$

As discussed above with reference to operation S410, computational complexity of this operation may be reduced when the pilot matrix P is structured in a way to facilitate low complexity matrix multiplication when multiplying elements by the pilot matrix P. For example, this multiplication can use the Fast Fourier Transform, if the columns of P are from a Fourier matrix, or the Fast Hadamard Transform, if the columns of P are from a Walsh-Hadamard matrix.

In operation S453B, the controller may overwrite clipped values in the processed measurement values $e^c[k]$ with corresponding predicted measurement values $\tilde{e}[k]$ to obtain corrected measurement values $\hat{e}[k]$, and maintain unclipped measurement values without any overwriting as follows:

$\hat{e}_n^R[k] = \tilde{e}_n^R[k]$, if $|e_n^{c,R}[k]|$ is at clipping threshold $\hat{e}_n^R[k] = e_n^{c,R}[k]$, if $|e_n^{c,R}[k]|$ is below clipping threshold $\hat{e}_n^I[k] = \tilde{e}_n^I[k]$, if $|e_n^{c,I}[k]|$ is at clipping threshold $\hat{e}_n^I[k] = e_n^{c,I}[k]$, if $|e_n^{c,I}[k]|$ is below clipping threshold  Eq. 10

In Eq. 10, the superscripts R and I may refer to real and imaginary components, respectively.

In operation S454B, the controller 130 may compute the estimated dense crosstalk vector $\bar{g}[k]$ from the corrected error samples $\hat{e}[k]$ by multiplying the corrected error samples by a pilot matrix transpose $P^T$ and then scaling, using the following equation:

$$\bar{g}[k] = T[k]^{-1}(La)^{-1} P^T \hat{e}[k] \qquad \text{Eq. 12}$$

As discussed above, again computational complexity may be reduced when the pilot matrix P, and thus the pilot matrix transpose $P^T$, is structured in a way to facilitate low complexity matrix multiplication when multiplying elements by the pilot matrix transpose $P^T$.

In operation S455B, the controller 130 may overwrite dense crosstalk estimates associated with the insignificant disturbers with zero to obtain improved sparse crosstalk estimates $\tilde{g}[k,t]$ for tone k associated with iteration t as follows:

$\tilde{g}_i[k,t] = \bar{g}_i[k]$ if $i$ is a significant disturber $\tilde{g}_i[k,t] = 0$, if $i$ is not a significant disturber  Eq.13

As discussed above, linear interpolation may introduce some error into the initial crosstalk estimate $\tilde{g}[k,0]$, and some of this error may propagate into the dense estimate $\bar{g}[k]$. However, the controller 130 may further reduce this error by setting insignificant disturbers to exactly zero.

In operation S456B, the controller 130 may determine whether a stop condition is satisfied. In some example embodiments the stop condition may be a maximum number of iterations, or crosstalk estimate $\tilde{g}[k,t]$ for the current iteration t being substantially the same as the crosstalk estimate $\tilde{g}[k,t-1]$ for the previous iteration t−1.

If the stop condition is satisfied, the controller 130 may complete the iterative solving of the reduced linear system, determine the final crosstalk estimate on tone k to be the latest sparse estimate $\hat{g}[k] = \tilde{g}[k,t]$, and proceed to operation S480.

If the stop condition is not satisfied, the controller 130 may proceed to operation S457B and advance the index of iterations such that t=t+1, and proceed back to operation S452B to repeat operations S452B to S456B multiple times on a given tone k to further improve the accuracy of the crosstalk estimate $\tilde{g}[k,t]$.

Figure 5:
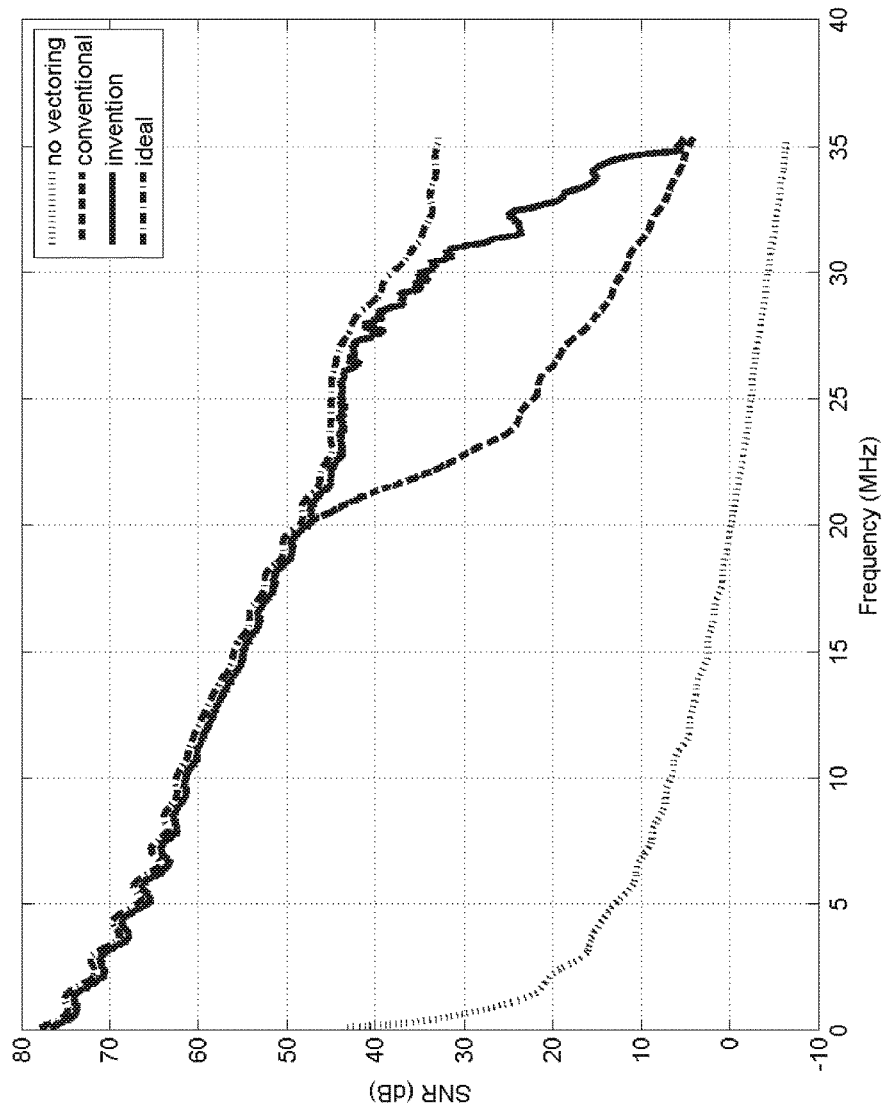
FIG. 5 illustrates a signal to noise ratio obtained on error feedback tones with errors clipped to 1.0 and with various estimation methods according to example embodiments.

FIG. 5 illustrates a signal to noise ratio obtained on error feedback tones with errors clipped and with various estimation methods according to example embodiments.

Referring to FIG. 5, FIG. 5 illustrates the signal to noise ratio (SNR) obtained on tones of different frequencies by an example joining line, when different methods of crosstalk channel estimation are used. The SNR values are generated from a simulation of these estimation procedures, using channel information representative of a 50-pair twisted pair cable of length 300 m, including 1 joining line and N−1=34 active lines. In this simulation, the clipping threshold for normalized error feedback was assumed to be 2.0.

In FIG. 5, the dotted curve indicates the SNR obtained if no estimation or precoding is performed. The dash-dot curve indicates the SNR obtained with perfect estimation, fully removing all crosstalk. The dashed curve indicates the SNR obtained using a conventional estimation procedure described by Eq. 3, in which the possible clipping of error samples is ignored. Finally, the solid curve indicates the SNR obtained according to some example embodiments as described by FIG. 4, where in operation S451B, the initial sparse crosstalk estimates are obtained via Eq. 9, and where the stopping condition is such that operations S452B through S455B are executed once for each tone having clipped measurements.

As illustrated, the proposed estimation method provides a higher SNR than the conventional method over a range of frequencies. As a result, the proposed estimation method may allow communication at a higher data rate than could be obtained with the conventional method.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

I claim:

1. A method of reducing crosstalk into a victim line from disturber lines in a communication system, the method comprising:
obtaining a pilot matrix and a measurement vector associated with the pilot matrix, the pilot matrix representing pilot signals transmitted by at least the disturber lines, the measurement vector being influenced by the pilot signals via the crosstalk;
estimating crosstalk coefficients of significant ones of the disturber lines by solving a reduced linear system using only non-clipped measurements in the measurement vector, the reduced linear system being derived from the pilot matrix;
determining compensation coefficients to reduce the crosstalk based on the crosstalk coefficients; and
reducing crosstalk by one or more of pre-compensating signals transmitted on the victim line and post-compensating signals received on the victim line based on the compensation coefficients.

2. The method of claim 1, further comprising:
determining which elements of the measurement vector are clipped measurements and which of the elements are the non-clipped measurements; and
determining which of the disturber lines are insignificant disturber lines and significant disturber lines, wherein the estimating includes setting the crosstalk coefficients associated with the insignificant disturber lines to zero.

3. The method of claim 2, wherein the estimating comprises:
determining reduced pilot matrices; and
estimating the crosstalk coefficients by solving a least squares problem based on the reduced pilot matrices.

4. The method of claim 3, wherein the solving the least squares problem comprises:
computing pseudo-inverse matrices; and
multiplying the non-clipped measurements by the pseudo-inverse matrices to estimate the crosstalk coefficients.

5. The method of claim 2, wherein the estimating comprises:
applying the pilot matrix to initial sparse ones of the crosstalk coefficients to generate predicted measurement values;
overwriting clipped measurement values with the predicted measurement values to generate corrected measurement values;
multiplying the corrected measurement values by a transpose of the pilot matrix to generate dense ones of the crosstalk coefficients; and
overwriting ones of the dense ones of the crosstalk coefficients associated with the insignificant disturber lines to zero to obtain improved sparse ones of the crosstalk coefficients.

6. The method of claim 5, further comprising:
determining the initial sparse ones of the crosstalk coefficients for one of a plurality of tones based on extrapolating or interpolating the improved sparse ones of the crosstalk coefficients associated with other tones of the plurality of tones.

7. The method of claim 6, wherein the other tones of the plurality of tones are tones having a lower frequency than the one of the plurality of tones.

8. The method of claim 4, wherein the estimating comprises:
iteratively improving the crosstalk coefficients until a stop condition is satisfied.

9. The method of claim 8, wherein the estimating includes determining that the stop condition is satisfied when the crosstalk coefficients for a current iteration is sufficiently close to the crosstalk coefficients for a previous iteration.

10. The method of claim 1, wherein the obtaining includes obtaining the pilot matrix such that columns of the pilot matrix represent columns of a Fourier matrix or Walsh-Hadamard Matrix.

11. A device comprising:
one or more processors configured to reduce crosstalk into a victim line from disturber lines in a communication system by,
obtaining a pilot matrix and a measurement vector associated with the pilot matrix, the pilot matrix representing pilot signals transmitted by at least the disturber lines, the measurement vector being influenced by the pilot signals via the crosstalk,
estimating crosstalk coefficients of significant ones of the disturber lines by solving a reduced linear system using only non-clipped measurements in the measurement vector, the reduced linear system being derived from the pilot matrix,
determining compensation coefficients to reduce the crosstalk based on the crosstalk coefficients, and reducing crosstalk by one or more of pre-compensating signals transmitted on the victim line and post-compensating signals received on the victim line based on the compensation coefficients.

12. The device of claim 11, wherein the one or more processors are further configured to,
determine which elements of the measurement vector are clipped measurements and which of the elements are the non-clipped measurements; and
determine which of the disturber lines are insignificant disturber lines and significant disturber lines, wherein the one or more processors are configured to estimate the crosstalk coefficients of significant ones of the disturber lines by setting the crosstalk coefficients associated with the insignificant disturber lines to zero.

13. The device of claim 12, wherein the one or more processors are configured to estimate the crosstalk values of significant ones of the disturber lines by,
determining reduced pilot matrices; and
estimating the crosstalk coefficients by solving a least squares problem based on the reduced pilot matrices.

14. The device of claim 12, wherein the one or more processors are configured to estimate the crosstalk values of significant ones of the disturber lines by,
applying the pilot matrix to initial sparse ones of the crosstalk coefficients to generate predicted measurement values;
overwriting clipped measurement values with the predicted measurement values to generate corrected measurement values;
multiplying the corrected measurement values by a transpose of the pilot matrix to generate dense ones of the crosstalk coefficients; and
overwriting ones of the dense ones of the crosstalk coefficients associated with the insignificant disturber lines to zero to obtain improved sparse ones of the crosstalk coefficients.

15. The device of claim 14, wherein the one or more processors are further configured to,
determine the initial sparse ones of the crosstalk coefficients for one of a plurality of tones based on extrapolating or interpolating the improved sparse ones of the crosstalk coefficients associated with other tones of the plurality of tones.

16. The device of claim 15, wherein the other tones of the plurality of tones are tones having a lower frequency than the one of the plurality of tones.

17. The device of claim 14, wherein the one or more processors are configured to estimate the crosstalk values of significant ones of the disturber lines by,
iteratively improving the crosstalk coefficients until a stop condition is satisfied.

18. The device of claim 17, wherein the one or more processors are configured to determine that the stop condition is satisfied when the crosstalk coefficients for a current iteration is sufficiently close to the crosstalk coefficients for a previous iteration.

19. The device of claim 11, wherein the one or more processors are configured to obtain the pilot matrix such that columns of the pilot matrix represent columns of a Fourier matrix or Walsh-Hadamard Matrix.

20. A method of estimating crosstalk into a victim line from disturber lines in a communication system, the method comprising:
obtaining a pilot matrix and a measurement vector associated with the pilot matrix, the pilot matrix representing pilot signals transmitted by at least the disturber lines, the measurement vector being influenced by the pilot signals via the crosstalk; and
estimating crosstalk coefficients of significant ones of the disturber lines by solving a reduced linear system using only non-clipped measurements in the measurement vector, the reduced linear system being derived from the pilot matrix.

* * * * *